(12) United States Patent
Hsu

(10) Patent No.: US 11,168,853 B2
(45) Date of Patent: Nov. 9, 2021

(54) LAMP WITH HANGING FUNCTION

(71) Applicant: Dong Guan Jia Sheng Lighting Technology Co., Ltd. China, Dong-Guna (CN)

(72) Inventor: Kevin Hsu, Taichung (TW)

(73) Assignee: Dong Guan Jia Sheng Lighting Technology Co., Ltd. China, Guang-Dong (CN)

( * ) Notice: Subject to any disclaimer, the term of this patent is extended or adjusted under 35 U.S.C. 154(b) by 138 days.

(21) Appl. No.: 16/745,804

(22) Filed: Jan. 17, 2020

(65) Prior Publication Data

US 2021/0222846 A1 Jul. 22, 2021

(51) Int. Cl.
*F21S 8/00* (2006.01)
*F16M 13/02* (2006.01)
*F21V 23/02* (2006.01)
*F21V 23/04* (2006.01)

(52) U.S. Cl.
CPC ............ *F21S 8/033* (2013.01); *F16M 13/02* (2013.01); *F21V 23/023* (2013.01); *F21V 23/0471* (2013.01)

(58) Field of Classification Search
CPC ........ F21S 8/033; F16M 13/02; F21V 23/023; F21V 23/04; F21V 23/0471; F21V 23/06; A47G 25/0607; A47G 25/0642
See application file for complete search history.

(56) References Cited

U.S. PATENT DOCUMENTS 6,241,365 B1 * 6/2001 Cook ................. A47G 25/0692
362/217.11
2020/0329895 A1 * 10/2020 Luu ..................... A47G 25/0607

* cited by examiner

*Primary Examiner* — Thomas M Sember
(74) *Attorney, Agent, or Firm* — Karin L. Williams; Alan D. Kamrath; Mayer & Williams PC

(57) ABSTRACT

A lamp includes a housing, a lighting device, a plurality of hanging members, a shaft, a plurality of returning members, a plurality of springs, and a power supply. The shaft extends through the housing and the hanging members, such that the hanging members are pivoted connected with the housing. In practice, when the hanging members are pivoted outward from the housing, the returning members are pushed by rotation of the hanging members, and the springs are compressed and contracted by the returning members. At this time, articles are hung on the hanging members, to support the hanging members, thereby preventing the hanging members from being moved back. After the articles are removed from the hanging members, the hanging members are driven and pivoted toward the housing by the returning members and the springs.

8 Claims, 4 Drawing Sheets

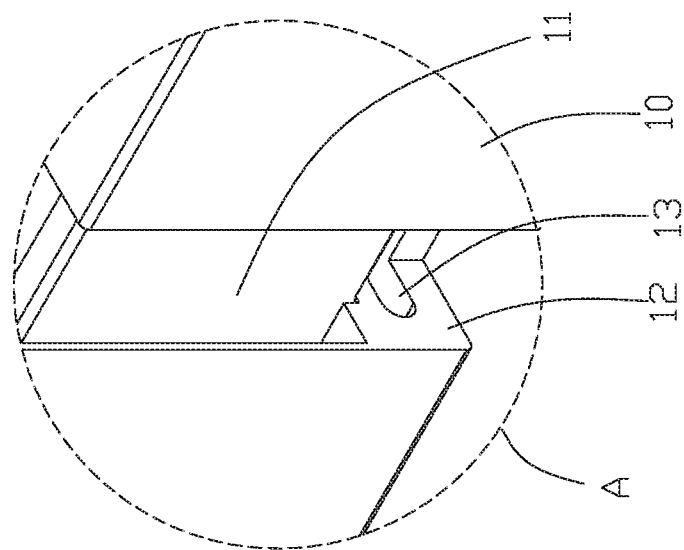

LAMP WITH HANGING FUNCTION

BACKGROUND OF THE INVENTION

1. Field of the Invention

The present invention relates to an illuminating apparatus and, more particularly, to a lamp (or wall lamp).

2. Description of the Related Art

A conventional wall lamp is mounted on the wall to provide an illuminating function. However, the conventional wall lamp only has a single function, and cannot provide a hanging function, thereby limiting the versatility of the conventional wall lamp.

BRIEF SUMMARY OF THE INVENTION

The primary objective of the present invention is to provide a lamp with a hanging function for hanging articles under a lighting condition so as to provide scenery lighting effect at an indoor entrance of the house.

In accordance with the present invention, there is provided a lamp comprising a housing, a lighting device, a plurality of hanging members, a shaft, a plurality of returning members, a plurality of springs, and a power supply. The lighting device is electrically connected with the power supply. The lighting device, the shaft, the returning members, the springs, and the power supply are mounted in the housing. The hanging members are pivotally mounted on the housing. The shaft extends through the housing and the hanging members, and pivotally connects the housing and the hanging members, such that the hanging members are pivoted about the shaft. The returning members press the hanging members respectively. The springs are biased between the housing and the returning members. In practice, when the hanging members are pivoted outward from the housing, the returning members are pushed by rotation of the hanging members, and the springs are compressed and contracted by the returning members. At this time, articles are hung on the hanging members, to support the hanging members, thereby preventing the hanging members from being moved back. After the articles are removed from the hanging members, the hanging members are driven and pivoted toward the housing by an interaction of the returning members and the springs, such that the hanging members are retracted into the housing.

According to the primary advantage of the present invention, the lighting device provides an illuminating function when the user hangs the articles on the hanging members, to facilitate the user operating the hanging members to hang the articles.

According to another advantage of the present invention, when the articles are hung on the hanging members, the gravity of the articles overcomes the elastic force of the springs, to prevent the hanging members from being moved back.

According to a further advantage of the present invention, after the articles are removed from the hanging members, the returning members push the hanging members to return to the original state by the restoring force of the springs, so as to retract into the housing.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

FIG. 4 is a locally enlarged view of the lamp taken along circle A as shown in FIG. 3.

DETAILED DESCRIPTION OF THE INVENTION

Figure 1:
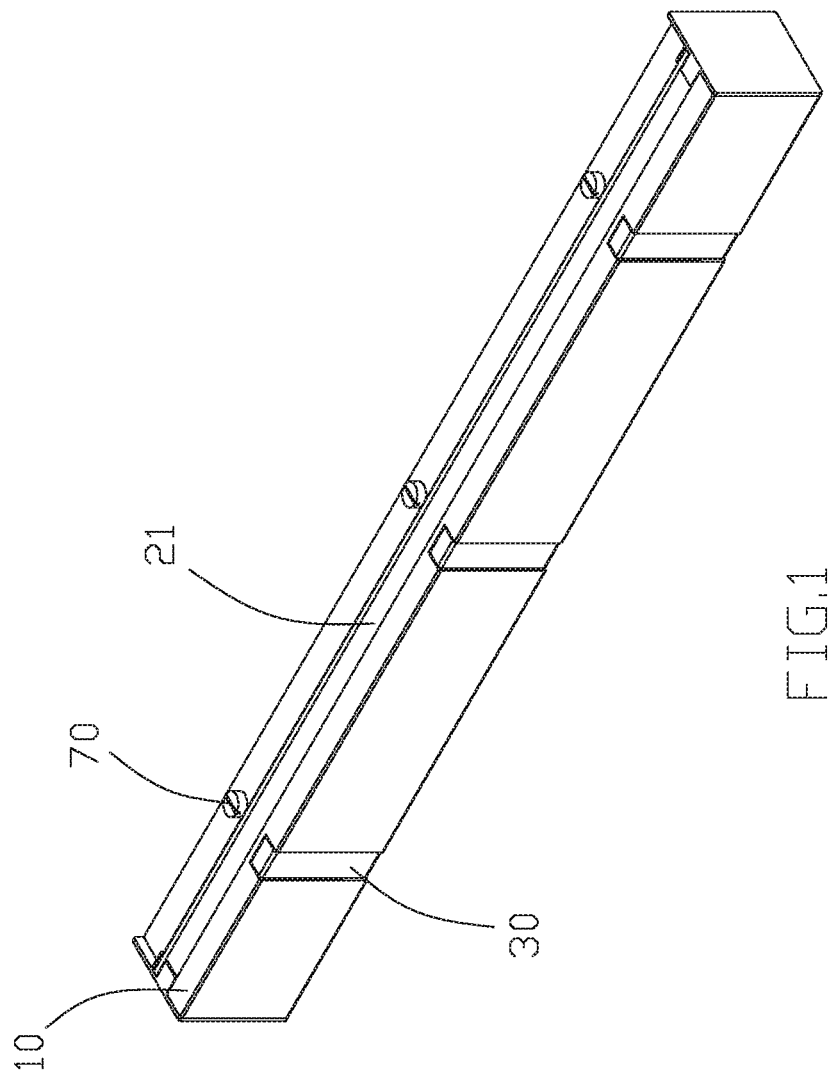
FIG. 1 is a perspective view of a lamp in accordance with the preferred embodiment of the present invention.

Referring to FIGS. 1-4, a lamp in accordance with the preferred embodiment of the present invention is mounted on a wall board of a house to provide scenery lighting effect at an indoor entrance, and to provide a hanging function. The lamp comprises a housing 10, a lighting device 20, a plurality of hanging members 30, a shaft (or stick) 40, a plurality of returning members 50, a plurality of springs 60, and a power supply.

The lighting device 20 is electrically connected with the power supply which provides an electric power to the lighting device 20. The lighting device 20, the shaft 40, the returning members 50, the springs 60, and the power supply are mounted in the housing 10. The hanging members 30 are pivotally mounted on the housing 10. The shaft 40 extends through the housing 10 and the hanging members 30, and pivotally connects the housing 10 and the hanging members 30, such that the hanging members 30 are pivoted about the shaft 40. The returning members 50 press the hanging members 30 respectively. The springs 60 are biased between the housing 10 and the returning members 50.

Figure 2:
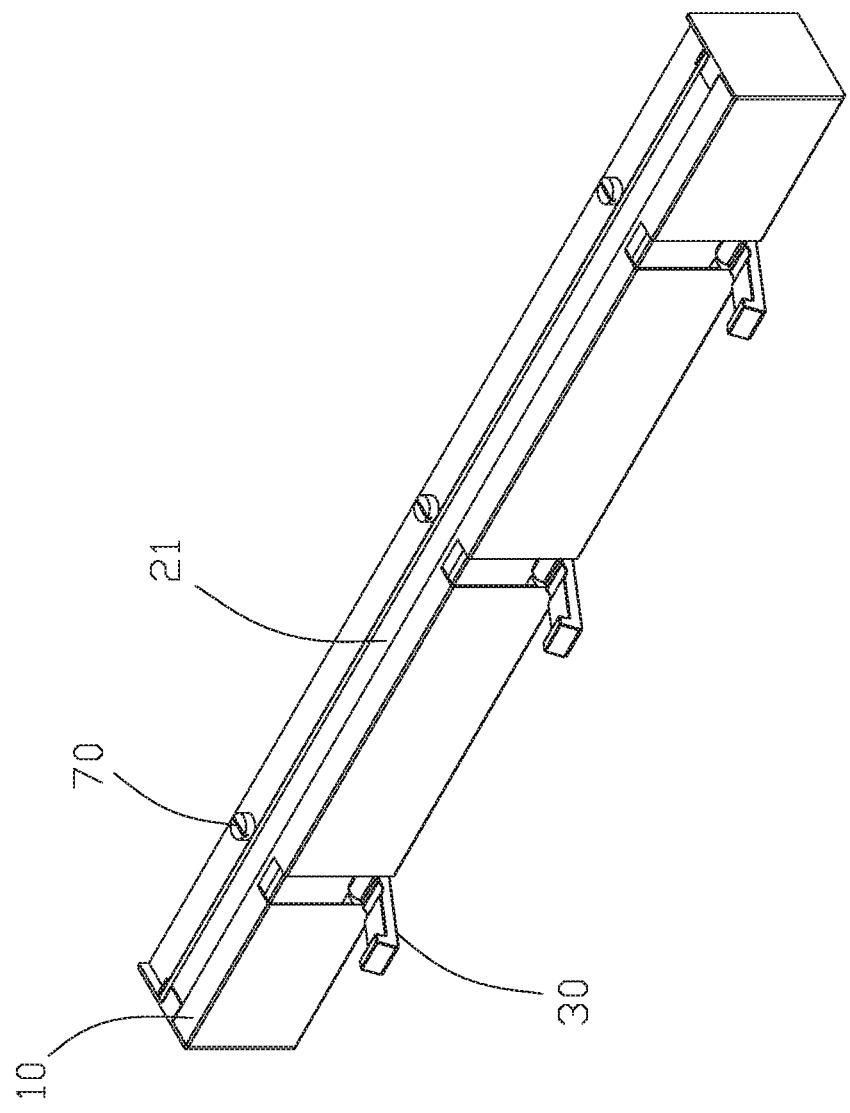
FIG. 2 is a schematic operational view of the lamp as shown in FIG. 1 in use.
Figure 3:
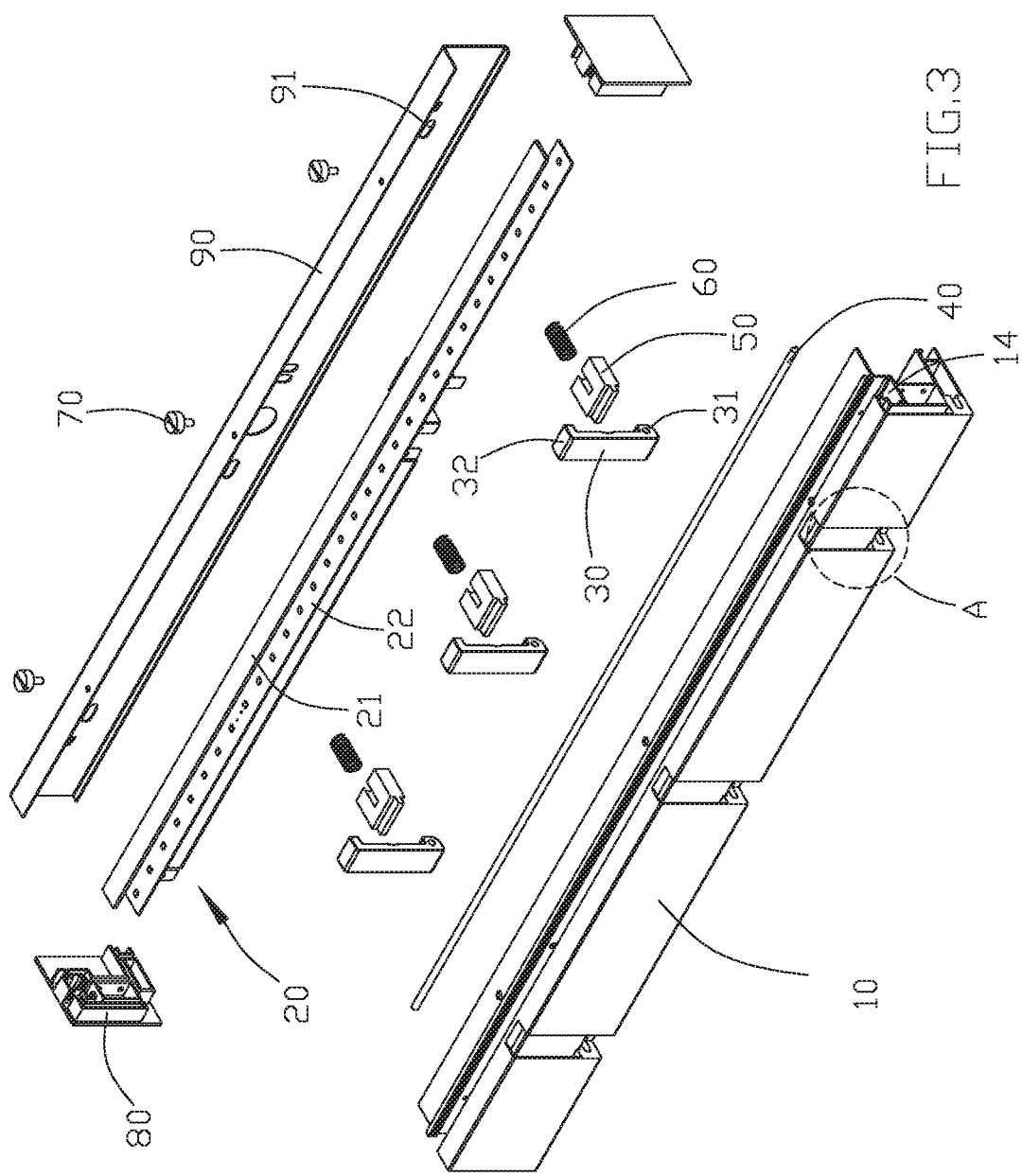
FIG. 3 is an exploded perspective view of the lamp in accordance with the preferred embodiment of the present invention.

In practice, when the hanging members 30 are opened and pivoted outward from the housing 10 as shown in FIG. 2, the returning members 50 are pushed by rotation of the hanging members 30, and the springs 60 are compressed and contracted by the returning members 50. At this time, articles are hung on the hanging members 30, to support the hanging members 30, thereby preventing the hanging members 30 from being moved back. After the articles are removed from the hanging members 30, the hanging members 30 are driven by a user's hand and are pivoted toward the housing 10, to quickly return to the original state by an interaction of the returning members 50 and the springs 60, such that the hanging members 30 are retracted into the housing 10 as shown in FIG. 1.

In the preferred embodiment of the present invention, the housing 10 has a face provided with a plurality of receiving slots 11, and the hanging members 30 are mounted in the receiving slots 11 of the housing 10.

In the preferred embodiment of the present invention, each of the receiving slots 11 of the housing 10 has a top and a bottom each provided with a transverse groove 12. The transverse groove 12 of the bottom of each of the receiving slots 11 has two sidewalls each provided with a mounting hole 13. Each of the hanging members 30 has a bottom provided with a pivot hole 31. The shaft 40 extends through the mounting hole 13 of each of the receiving slots 11 of the housing 10 and the pivot hole 31 of each of the hanging members 30, such that each of the hanging members 30 is pivotally mounted on the housing 10.

In the preferred embodiment of the present invention, each of the hanging members 30 has a top provided with a protruding block 32 extending transversely. The protruding block 32 of each of the hanging members 30 is mounted in the transverse groove 12 of the top of one of the receiving slots 11 when each of the hanging members 30 is closed and rests on the housing 10. Thus, the protruding block 32 of each of the hanging members 30 covers the transverse groove 12 of the top of one of the receiving slots 11 when each of the hanging members 30 is closed, to enhance the aesthetic quality of the lamp. In addition, the protruding block 32 of each of the hanging members 30 limits the article when each of the hanging members 30 is opened, to prevent the article from dropping In the preferred embodiment of the present invention, the housing 10 has a top provided with a channel 14. The lighting device 20 includes an illuminating member (or a light emitting member) 22 mounted in the housing 10, and a transparent cover (or hood) 21 mounted in the channel 14 of the housing 10. The illuminating member 22 is electrically connected with the power supply.

In the preferred embodiment of the present invention, the lamp further comprises a rear cap 90 mounted on an open side of the housing 10, a plurality of threaded rods (or screws) 70 extending through the rear cap 90 and the housing 10 to connect the rear cap 90 with the housing 10, and two end caps 80 mounted on two ends of the housing 10.

In the preferred embodiment of the present invention, the rear cap 90 is provided with a plurality of fixing (or securing) holes 91 for mounting and attaching the rear cap 90 to the wall board by a plurality of fasteners.

In the preferred embodiment of the present invention, the lamp further comprises a far infrared sensor mounted in the housing 10, and a control circuit board mounted in the housing 10. The control circuit board is electrically connected with the lighting device 20, the far infrared sensor, and the power supply. The control circuit board is used to turn on/off the lighting device 20. When the far infrared sensor detects a human body approaches, the far infrared sensor transmits a signal to the control circuit board which turns on the lighting device 20 immediately. The control circuit board turns off the lighting device 20 under a normal condition. Alternatively, the lighting device 20 is turned on/off manually.

In the preferred embodiment of the present invention, the lamp further comprises a plurality of elastic members.

In the preferred embodiment of the present invention, the transverse groove 12 of the bottom of each of the receiving slots 11 has a top wall that restricts a further pivotal movement of each of the hanging members 30, to prevent each of the hanging members 30 from being rotated through an excessive angle.

In the preferred embodiment of the present invention, the pivot hole 31 penetrates each of the hanging members 30.

Accordingly, the lighting device 20 provides an illuminating function when the user hangs the articles on the hanging members 30, to facilitate the user operating the hanging members 30 to hang the articles. In addition, when the articles are hung on the hanging members 30, the gravity of the articles overcomes the elastic force of the springs 60, to prevent the hanging members 30 from being moved back. Further, after the articles are removed from the hanging members 30, the returning members 50 push the hanging members 30 to return to the original state by the restoring force of the springs 60, so as to retract into the housing 10.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

The invention claimed is:

1. A lamp comprising:
a housing, a lighting device, a plurality of hanging members, a shaft, a plurality of returning members, a plurality of springs, and a power supply;
the lighting device is electrically connected with the power supply;
the lighting device, the shaft, the returning members, the springs, and the power supply are mounted in the housing;
the hanging members are pivotally mounted on the housing;
the shaft extends through the housing and the hanging members, and pivotally connects the housing and the hanging members, such that the hanging members are pivoted about the shaft;
the returning members press the hanging members respectively;
the springs are biased between the housing and the returning members;
when the hanging members are pivoted outward from the housing, the returning members are pushed by rotation of the hanging members, and the springs are compressed and contracted by the returning members;
articles are hung on the hanging members, to support the hanging members, thereby preventing the hanging members from being moved back; and
after the articles are removed from the hanging members, the hanging members are driven and pivoted toward the housing by an interaction of the returning members and the springs, such that the hanging members are retracted into the housing.

2. The lamp of claim 1, wherein the housing has a face provided with a plurality of receiving slots, and the hanging members are mounted in the receiving slots of the housing.

3. The lamp of claim 2, wherein:
each of the receiving slots of the housing has a top and a bottom each provided with a transverse groove;
the transverse groove of the bottom of each of the receiving slots has two sidewalls each provided with a mounting hole;
each of the hanging members has a bottom provided with a pivot hole; and
the shaft extends through the mounting hole of each of the receiving slots of the housing and the pivot hole of each of the hanging members, such that each of the hanging members is pivotally mounted on the housing.

4. The lamp of claim 3, wherein:
each of the hanging members has a top provided with a protruding block extending transversely; and
the protruding block of each of the hanging members is mounted in the transverse groove of the top of one of the receiving slots when each of the hanging members rests on the housing.

5. The lamp of claim 1, wherein:
the housing has a top provided with a channel;
the lighting device includes an illuminating member mounted in the housing, and a transparent cover mounted in the channel of the housing; and
the illuminating member is electrically connected with the power supply.

6. The lamp of claim 1, further comprising:
a rear cap mounted on an open side of the housing;

a plurality of threaded rods extending through the rear cap and the housing to connect the rear cap with the housing; and two end caps mounted on two ends of the housing.

7. The lamp of claim 6, wherein the rear cap is provided with a plurality of fixing holes.

8. The lamp of claim 1, further comprising:

a far infrared sensor mounted in the housing; and a control circuit board mounted in the housing;

wherein:

the control circuit board is electrically connected with the lighting device, the far infrared sensor, and the power supply.

* * * * *